(12) United States Patent
Albrighton et al.

(10) Patent No.: US 10,329,472 B2
(45) Date of Patent: Jun. 25, 2019

(54) WELLBORE ADDITIVES THAT INCLUDE LIQUID-INFILTRATED POROUS SILICA

(71) Applicant: Halliburton Energy Services, Inc., Houston, TX (US)

(72) Inventors: Lucas David Albrighton, Centennial, CO (US); Adam Matthew McKay, Denver, CO (US); Paul Joseph Jones, Houston, TX (US); Evan Baker Grimes, Gadsden, AL (US); Evan Thomas Russell, Grand Junction, CO (US); Dominik Fry, Thornton, CO (US); Ryan Edward Barker, Grand Junction, CO (US); Sears T. Dealy, Comanche, OK (US); B. Raghava Reddy, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/548,751

(22) PCT Filed: Mar. 4, 2015

(86) PCT No.: PCT/US2015/018586
§ 371 (c)(1),
(2) Date: Aug. 3, 2017

(87) PCT Pub. No.: WO2016/140656
PCT Pub. Date: Sep. 9, 2016

(65) Prior Publication Data
US 2018/0037796 A1   Feb. 8, 2018

(51) Int. Cl.
*E21B 33/13* (2006.01)
*C09K 8/42* (2006.01)
(Continued)

(52) U.S. Cl.
CPC .............. *C09K 8/424* (2013.01); *C04B 28/02* (2013.01); *C09K 8/32* (2013.01); *C09K 8/40* (2013.01); *C09K 8/467* (2013.01); *E21B 33/13* (2013.01)

(58) Field of Classification Search
CPC .......... C09K 8/424; C09K 28/02; C09K 8/32; C09K 8/40; C09K 8/467; E21B 33/13
(Continued)

(56) References Cited

U.S. PATENT DOCUMENTS 6,170,575 B1   1/2001   Reddy et al.
6,209,646 B1   4/2001   Reddy et al.
(Continued)

FOREIGN PATENT DOCUMENTS

WO   WO-2016/140656 A1   9/2016

OTHER PUBLICATIONS

Schulze, "Flow Properties of Powders and Bulk Solids," 2006, retrieved from http://www.dietmar-schulze.de/grdle1.pdf, 21 pages.
(Continued)

*Primary Examiner* — Silvana C Runyan
(74) *Attorney, Agent, or Firm* — Thomas Rooney; C. Tumey Law Group PLLC

(57) ABSTRACT

Fluid additives suitable for use in a wellbore (e.g., a liquid comprising an aqueous miscible fluid, a liquid surfactant, or both) may be converted into a liquid-infiltrated porous silica that is a flowable bulk solid. The flowable bulk solid may then be handled and stored as a traditional solid wellbore additive. For example, the flowable bulk solid may be added to an aqueous fluid to produce a wellbore fluid that is then introduced into a wellbore penetrating a subterranean formation.

18 Claims, 1 Drawing Sheet

(51) Int. Cl.
    *C04B 28/02*     (2006.01)
    *C09K 8/40*     (2006.01)
    *C09K 8/467*     (2006.01)
    *C09K 8/32*     (2006.01)

(58) Field of Classification Search
    USPC .......................................................... 166/292
    See application file for complete search history.

(56) References Cited

U.S. PATENT DOCUMENTS

| | | |
|---|---|---|
| 6,245,142 B1 | 6/2001 | Reddy et al. |
| 6,283,213 B1 * | 9/2001 | Chan ........................ E21B 33/13 |
| | | 166/291 |
| 7,968,501 B2 | 6/2011 | Parris |
| 2003/0221831 A1 * | 12/2003 | Reddy ...................... C04B 20/12 |
| | | 166/293 |
| 2004/0040711 A1 | 3/2004 | Tomlinson |
| 2006/0042798 A1 * | 3/2006 | Badalamenti ........... E21B 21/10 |
| | | 166/285 |
| 2014/0224494 A1 | 8/2014 | Smith |
| 2014/0374095 A1 | 12/2014 | Ladva et al. |

OTHER PUBLICATIONS

International Search Report and Written Opinion from PCT/US/2015/018586, dated Sep. 21, 2015, 10 pages.

\* cited by examiner

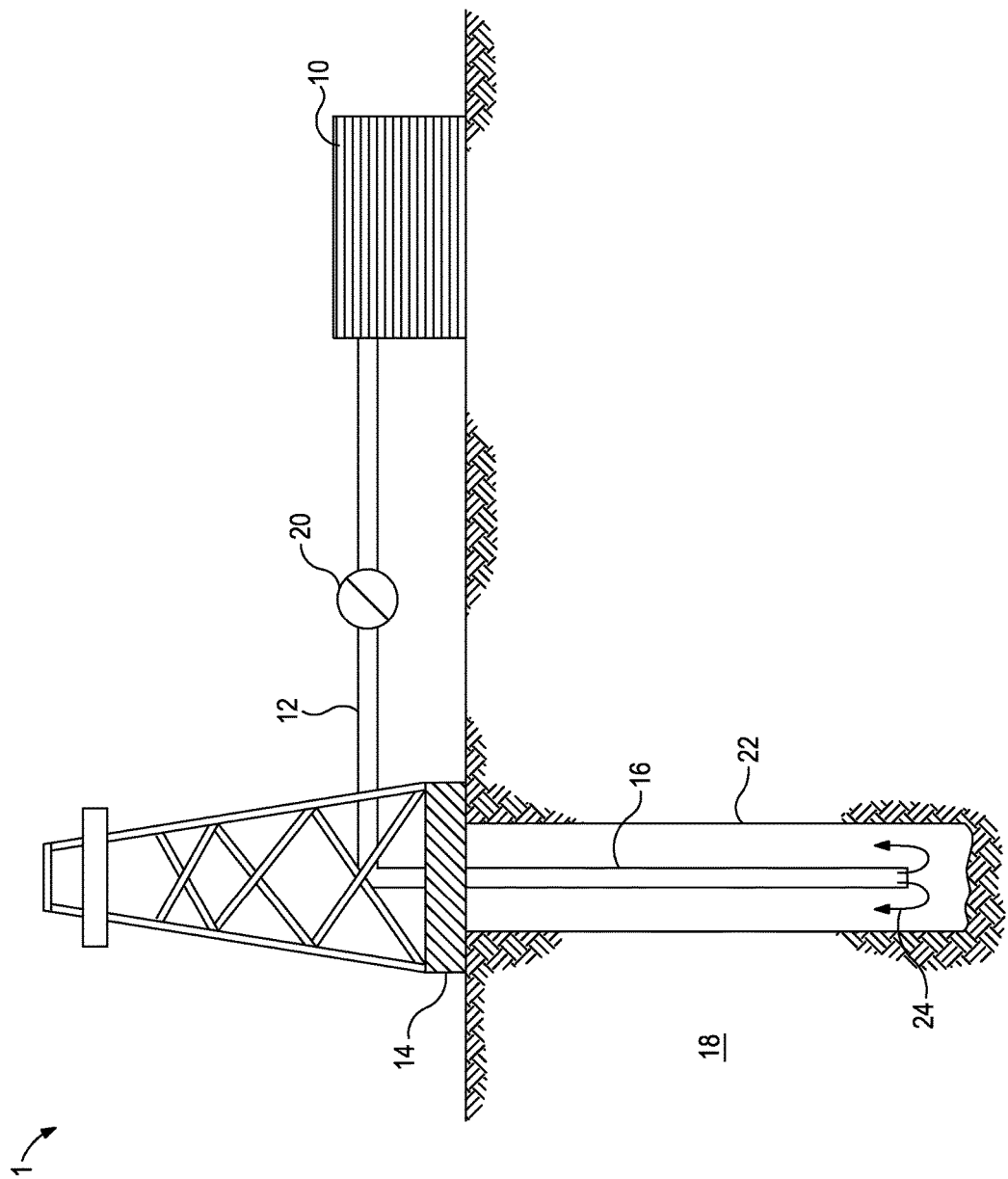

WELLBORE ADDITIVES THAT INCLUDE LIQUID-INFILTRATED POROUS SILICA

BACKGROUND

The embodiments described herein relate to wellbore additives.

Wellbore fluids are often complex formulations that include several additives that are typically mixed on-site. The wellbore additives used often include both liquid additives (e.g., liquid surfactants and aqueous-miscible solvents) and solid additives (e.g., weighting agents, cements, and fluid loss control agents). Using both solid and liquid additives when producing a wellbore fluid often requires multiple pieces of equipment, additional storage facilities, and increased manpower to prepare the wellbore fluid and maintain the equipment. The additional equipment, storage facilities, and manpower can increase the cost of the wellbore operations.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering a wellbore fluid to a downhole location according to at least some embodiments described herein.

DETAILED DESCRIPTION

The embodiments described herein relate to wellbore additives. More specifically, the embodiments described herein relate to liquid additives converted to solid additives, specifically, as liquid-infiltrated porous silica (LIPS), and the use of LIPS in flowable bulk solid wellbore additives.

As used herein, the term "flowable bulk solid" refers to powders, particulates, or mixtures thereof that have less than a 45° angle of repose according to ASTM D6393-14, Section 1.3.1: Measurement of Carr Angle of Repose). A flowable bulk solid may consist of a single component (e.g., the LIPS described herein) or multiple components (e.g., the LIPS described herein in combination with weighting agents).

As used herein, the terms "liquid-infiltrated porous silica" and "LIPS" refers to a porous silica particle having liquid-infiltrated into the pores of the particle. The LIPS described herein that are included in the flowable bulk solids have an amount of liquid-infiltrated into the pores of the silica particles such that the LIPS are flowable (i.e., have less than a 45° angle of repose according to ASTM D6393-14, Section 1.3.1: Measurement of Carr Angle of Repose).

As described previously, specialty storage facilities and mixing equipment may be required at a well site to accommodate the use of liquid wellbore additives. Without being limited by theory, it is believed that the porous silica of the LIPS described herein act as a carrier for the liquid-infiltrated therein. Once mixed with water, at least a portion of the infiltrated liquid of the LIPS may disperse into the water. Because the LIPS are flowable particulates, the LIPS may advantageously be stored, conveyed, and mixed at the well site (or at another site like a mixing facility) as other solid flowable additives like cement particles and weighting agents. This may beneficially reduce or eliminate the facilities, equipment, and associated costs with liquid wellbore additives.

In some instances, the liquids in the LIPS described herein may be chosen to be suitable for use in removing films or coatings adsorbed on surfaces. Many wellbore operations, such as drilling, fracturing, and remedial operations, are conducted using oleaginous fluid systems, such as oil-based drilling fluids, hydrocarbon-based fracturing fluid, and resin-based fluids. When such fluids are used downhole, the oil, hydrocarbon, and resins buildup on the surface of the wellbore and equipment downhole like tubulars. When the oleaginous fluid is displaced by a water-based fluid like a cement slurry or a spacer fluid, a film or coating of the oleaginous fluid remains on the surfaces. This film hinders interaction between the surface and the components of the water-based fluid. For example, a set cement produced from the cement slurry does not adhere well, if at all, to the surface when the oleaginous film is present. This allows for other fluids to infiltrate the space between the set cement and the surface of the wellbore or the tubulars disposed therein, which may allow for fluids to migrate along the wellbore and hinder zonal isolation.

Liquid surfactants, aqueous-miscible liquids (e.g., solvents and mutual solvents), and combinations thereof may be liquids that are useful in removing oleaginous films from surfaces, and therefore, useful in producing LIPS suitable for use as a wellbore additive. Examples of such liquids suitable may include, but are not limited to, 3-lauroylamidopropyl betaine, alkylphenol ethoxylates (e.g., ethoxylated nonylphenol), ethoxylated $C_6$-$C_{10}$ alcohols (e.g., ethoxylated hexanol), ammonium ethoxylated alkyl $C_6$-$C_{10}$ ethers sulfate, ethylene glycol monobutyl ether, alcohols (e.g., ethyl alcohol, propyl alcohol, and butyl alcohol), ketones (e.g., acetone and methyl ethyl ketone), chlorinated solvent (e.g., methylene chloride), hydrochloric acid, and the like, and any combination thereof. Some of the foregoing liquids may have a sufficiently high viscosity that mixtures with less viscous liquids (e.g., water, alcohols, and combinations thereof) may provide better infiltration of the porous silica.

The amount of liquid in the LIPS may be measured by subtracting the dry weight (i.e., with no liquid infiltration) from the infiltrated weight. In some instances, the amount of liquid in the LIPS may be about 1% to about 50% by weight of the porous silica (i.e., the dry weight of the porous silica), including subsets therebetween (e.g., about 1% to about 5%, about 1% to about 10%, about 1% to about 25%, about 10% to about 50%, or about 25% to about 50%.

The porous silica of the LIPS described herein may, in some instances, have a particle size characterized by $d_{50}$ between about 0.01 microns and about 200 microns, including subsets thereof (e.g., about 0.01 microns to about 0.1 microns, about 0.01 microns to about 0.5 microns, about 0.01 microns to about 1 microns, about 1 microns to about 50 microns, about 50 microns to about 150 microns, about 100 microns to about 200 microns, about 100 microns to about 150 microns, or about 150 microns to about 200 microns). As used herein, the term "$d_{50}$" refers to the diameter at which 50% of the particles by weight are smaller. For example, a $d_{50}$ of 120 microns means 50% of the particles by weight are smaller than 120 microns. Particle size can be determined by laser diffraction using ISO 13320:2009.

In some embodiments, the surface area of the porous silica of the LIPS described herein may, in some instances, be about 150 m²/g to about 1000 m²/g, including subsets thereof (e.g., about 150 m²/g to about 250 m²/g, about 150 m²/g to about 500 m²/g, about 250 m²/g to about 1000 m²/g, about 500 m²/g to about 1000 m²/g, or about 750 m²/g to about 1000 m²/g,). Surface area can be determined by gas adsorption as described in ISO 9277:2010.

Infiltrating the porous silica with a liquid may involve, instilling (portion-wise or continuously) the liquid into a container of porous silica particle. Generally, the porous silica may be mixed, stirred, flowed, or the like during instillation of the liquid so that the liquid infiltrates the porous silica more evenly and does not build up or cause clumping, which result in LIPS with a higher angle of repose and, potentially, nonflowable. In some instances, more than one liquid may be used, separately or as a mixture, to infiltrate the porous silica.

The LIPS described herein may be included in a flowable bulk solid in an amount of about 1% to about 100% by weight of the flowable bulk solid. Other components in a flowable bulk solid that is suitable for use as a wellbore additive may include, but are not limited to, weighting agents, cement particles, set retarders, set accelerators, fluid loss control agents, surfactants, polymers, and the like.

Because the specific gravity of the porous silica of the LIPS is greater than water, in some instances, a flowable bulk solid wellbore additive may include less weighting agent. When included in the flowable bulk solid wellbore additive or the wellbore fluid, the weight ratio of LIPS to weighting agent may be about 0.1:99.9 to about 99.9:0.1, including any subset therebetween (e.g., about 1:99 to about 99:1, about 1:99 to about 10:90, about 1:99 to about 25:75, about 1:99 to about 50:50, about 25:75 to about 75:25, about 50:50 to about 99:1, about 75:25 to about 99:1, or about 90:10 to about 99:1).

When included in the flowable bulk solid wellbore additive or the wellbore fluid, the weight ratio of LIPS to cement particles may be about 0.1:100 to about 70:100, including any subset therebetween (e.g., about 0.1:100 to about 50:100, about 0.1:100 to about 25:100, about 0.1:100 to about 10:100, or about 0.1:100 to about 1:100).

When included in the flowable bulk solid wellbore additive or the wellbore fluid, the set retarders and the set accelerators may each independently be present at a weight ratio to LIPS (i.e., set retarder to LIPS or set accelerator to LIPS) of about 1:700 to about 100:700, including any subset therebetween (e.g., about 1:700 to about 50:700, about 1:700 to about 10:700, about 10:700 to about 100:700, or about 50:700 to about 100:700,).

When included in the flowable bulk solid wellbore additive or the wellbore fluid, the polymers and the fluid loss control agents may each independently be present at a weight ratio to LIPS of about 1:700 to about 250:700, including any subset therebetween (e.g., about 1:700 to about 100:700, about 1:700 to about 50:700, about 1:700 to about 10:700, about 10:700 to about 250:700, about 50:700 to about 250:700, or about 100:700 to about 250:700).

Flowable bulk solid wellbore additives may be designed for use in producing various water-based wellbore fluids (e.g., spacer fluids and cement slurries). As discussed previously, the LIPS described herein may be added as an individual component to the water or as a part of a mixture of components to the water.

The LIPS described herein may be present in the wellbore fluid in an amount of about an amount of about 0.1% to about 80% by weight of the wellbore fluid, including any subset therebetween (e.g., about 0.1% to about 10%, about 0.1% to about 25%, 1% to about 25%, about 10% to about 50%, about 25% to about 50%, about 25% to about 80%, or about 50% to about 80%).

By way of nonlimiting example, a spacer fluid may comprise water, LIPS, and weighting agent and optionally further comprise polymers, fluid loss control agents, or a combination thereof. The concentration of LIPS and weighting agent may be sufficient to provide for a spacer fluid with a density of about 9 pounds per gallon (lb/gal) (1.1 g/mL) to about 22 lb/gal (2.6 g/mL). For example, a spacer fluid may include water at about 29% to about 60% by weight of the spacer fluid, LIPS at about 0.1% to about 70% by weight of the spacer fluid, and weighting agent at about 0.1% to about 70% by weight of the spacer fluid.

In some instances, the polymers (e.g., as a viscosifier) may be included in the spacer fluid at about 0.1% to about 20% by weight of the spacer fluid. In some instances, the fluid loss control agents may be included in the spacer fluid at about 0.1% to about 20% by weight of the spacer fluid. Combinations of the foregoing may be used.

A flowable bulk solid wellbore additive may include one or more of the non-liquid components in the spacer fluid. For example, the flowable bulk solid wellbore additive may include LIPS and weighting agents in an appropriate ratio to provide for the desired concentrations in the spacer fluid. Then, if desired, fluid loss control agents, polymers, or both may be added separately to the water or included in the flowable bulk solid wellbore additive. In another example, the flowable bulk solid wellbore additive may consist of the LIPS and the other components may be added to the water separately.

By way of another nonlimiting example, a cement slurry may comprise water, LIPS, weighting agent, and cement particles and optionally further comprise set retarders, set accelerators, fluid loss control agents, polymers, or a combination thereof. For example, a cement slurry may include water at about 25% to about 150% by weight of the cement particles (bwoc), LIPS at about 1% to about 70% bwoc, and weighting agents at about 1% to about 70% bwoc. Further, the cement slurry may further include at least one of: set retarders at about 0.1% to about 10% bwoc, set accelerators at about 0.1% to about 10% bwoc, fluid loss control agents at about 0.1% to about 10% bwoc, polymers (e.g., as a viscosifier) at about 0.01% to about 25% bwoc.

Similar to spacer fluids, a flowable bulk solid wellbore additive may include one or more of the non-liquid components in the cement slurry. For example, the flowable bulk solid wellbore additive may include the cement particles, the LIPS, and the weighting agents. In another example, the flowable bulk solid wellbore additive may include the LIPS and the weighting agent. Then, this flowable bulk solid wellbore additive and cement particles may be added separately to water. One skilled in the art will recognize the plurality of combinations of the foregoing components of the cement slurry that can be used to design a flowable bulk solid wellbore additive.

The LIPS and wellbore fluids may be implemented in cementing operations and corresponding wellbore systems.

By way of nonlimiting example, an oleaginous drilling fluid may be displaced by a spacer fluid followed by a cement slurry, where the spacer fluid, the cement slurry, or both are produced using LIPS.

In another nonlimiting example, an oleaginous drilling fluid may be displaced by a cement slurry produced with the LIPS described herein.

In both of the foregoing examples, the liquid in the LIPS may be dispersed in the water of the corresponding fluid and at least partially remove an oleaginous film on the wellbore, the tubulars disposed therein, or both. After allowing the cement slurry to set, the set cement may more effectively bond to the tubulars, the wellbore, or both because at least some of the oleaginous film had been removed from the surfaces thereof.

In various embodiments, systems configured for preparing, transporting, and delivering the wellbore fluids (e.g., spacer fluids and cement slurries) produced with the flowable bulk solid wellbore additives that include LIPS described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a wellbore fluid produced with the flowable bulk solid wellbore additives that include LIPS described herein. The pump may be, for example, a high pressure pump or a low pressure pump, which may depend on, inter alia, the viscosity and density of the wellbore fluid, the type of the cementing operation, and the like.

In some embodiments, the systems described herein may further comprise a mixing tank arranged upstream of the pump and in which the wellbore fluid is formulated (e.g., where water may be mixed with the flowable bulk solid wellbore additives that include LIPS described herein and any other components of the wellbore fluid). In various embodiments, the pump (e.g., a low pressure pump, a high pressure pump, or a combination thereof) may convey the wellbore fluid from the mixing tank or other source of the wellbore fluid to the tubular. In other embodiments, however, the wellbore fluid can be formulated offsite and transported to a worksite, in which case the wellbore fluid may be introduced to the tubular via the pump directly from a transport vehicle or a shipping container (e.g., a truck, a railcar, a barge, or the like) or from a transport pipeline. In yet other embodiments, the wellbore fluid may be formulated on the fly at the well site where components of the wellbore fluid (e.g., the flowable bulk solid wellbore additives that include the LIPS described herein and any other components of the wellbore fluid) are pumped (e.g., via pneumatic feeding) from a transport (e.g., a vehicle or pipeline) and mixed during introduction into the tubular. In any case, the wellbore fluid may be drawn into the pump, elevated to an appropriate pressure, and then introduced into the tubular for delivery downhole.

FIG. 1 shows an illustrative schematic of a system that can deliver wellbore fluids described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a wellbore fluid may be formulated. Again, in some embodiments, the mixing tank 10 may represent or otherwise be replaced with a transport vehicle or shipping container configured to deliver or otherwise convey the wellbore fluid to the well site. The wellbore fluid may be conveyed via line 12 to wellhead 14, where the wellbore fluid enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the wellbore fluid may subsequently return up the wellbore in the annulus between the tubular 16 and the wellbore 22 as indicated by flow lines 24. In other embodiments, the wellbore fluid may be reverse pumped down through the annulus and up tubular 16 back to the surface, without departing from the scope of the disclosure. Pump 20 may be configured to raise the pressure of the wellbore fluid to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement is introduced into an annulus between a tubular and the wellbore and returns to the wellhead through the tubular), and the like).

It is also to be recognized that the disclosed wellbore fluids and components thereof may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: a method that includes adding a flowable bulk solid into an aqueous fluid to produce a wellbore fluid, wherein the flowable bulk solid comprises a liquid-infiltrated porous silica, wherein the liquid comprises a liquid surfactant, an aqueous miscible fluid, or both; and introducing the wellbore fluid into a wellbore penetrating a subterranean formation;

Embodiment B: a composition that includes a flowable bulk solid that includes a liquid-infiltrated porous silica, wherein the liquid comprises a liquid surfactant, an aqueous miscible fluid, or both; and Embodiment C: a system that includes a tubular extending into a wellbore penetrating a subterranean formation (e.g., extending from a wellhead) where an annulus is defined between the tubular and the wellbore; and a pump fluidly coupled to the tubular, wherein the tubular, the annulus, or both contain a wellbore fluid produce by mixing water with a flowable bulk solid that includes a liquid-infiltrated porous silica, wherein the liquid comprises an aqueous miscible fluid, a liquid surfactant, or both.

Each of embodiments A, B, and C may have one or more of the following additional elements in any combination:
Element 1: wherein the liquid-infiltrated porous silica is present in the flowable bulk solid at about 0.1% to about 100% by weight of the flowable bulk solid; Element 2: wherein the wellbore fluid, the flowable bulk solid, or the composition further comprises a weighting agent that is different than the liquid-infiltrated porous silica; Element 3: Element 2 and wherein a weight ratio of the liquid-infiltrated porous silica to the weighting agent is about 0.1:99.9 to about 99.9:0.1; Element 4: wherein the flowable bulk solid further includes a set retarder; Element 5: Element 4 and wherein a weight ratio of the set retarder to the liquid-infiltrated porous silica is about 1:700 to about 100:700; Element 6: wherein the flowable bulk solid further includes a set accelerator; Element 7: Element 6 and wherein a weight ratio of the set accelerator to the liquid-infiltrated porous silica is about 1:700 to about 100:700; Element 8: wherein the wellbore fluid, the flowable bulk solid, or the composition further comprises a fluid loss control agent that is different than the liquid-infiltrated porous silica; Element 9: Element 8 and wherein a weight ratio of the fluid loss control agent to the liquid-infiltrated porous silica is about 1:700 to about 250:700; Element 10: wherein the wellbore fluid, the flowable bulk solid, or the composition further comprises a polymer; Element 11: wherein a weight ratio of the polymer to the liquid-infiltrated porous silica is about 1:700 to about 250:700; and Element 12: wherein the wellbore fluid, the flowable bulk solid, or the composition further comprises cement particles.

By way of non-limiting example, exemplary combinations applicable to Embodiments A, B, and C include: Element 2 and optionally Element 3 in combination with Element 4 and optionally Element 5; Element 2 and optionally Element 3 in combination with Element 6 and optionally Element 7; Element 2 and optionally Element 3 in combination with Element 8 and optionally Element 9; Element 2 and optionally Element 3 in combination with Element 10 and optionally Element 11; Element 4 and optionally Element 5 in combination with Element 6 and optionally Element 7; Element 4 and optionally Element 5 in combination with Element 8 and optionally Element 9; Element 4 and optionally Element 5 in combination with Element 10 and optionally Element 11; Element 6 and optionally Element 7 in combination with Element 8 and optionally Element 9; Element 6 and optionally Element 7 in combination with Element 10 and optionally Element 11; Element 8 and optionally Element 9 in combination with Element 10 and optionally Element 11; Element 1 in combination with any of the foregoing; and Element 1 in combination with one of Elements 2-12.

Embodiment A may have one or more of the following additional elements alone or in combination with one or more of Elements 1-12: Element 13: wherein the wellbore fluid is a spacer fluid and the method further comprises: introducing an oleaginous drilling fluid into the wellbore; introducing the spacer fluid into the wellbore after the oleaginous drilling fluid; and introducing a cement slurry into the wellbore after the spacer fluid; and Element 14: wherein the wellbore fluid is a cement slurry and further comprises cement particles, and wherein the method further comprises: introducing an oleaginous drilling fluid into the wellbore; and introducing the slurry into the wellbore after the oleaginous drilling fluid. By way of non-limiting example, exemplary combinations applicable to Embodiment A include: Element 13 in combination with one or more of Elements 1-2, 8-12 including in the foregoing combinations; and Element 14 in combination with one or more of Elements 1-12 including in the foregoing combinations.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

Five liquids (Table 1) were analyzed for their efficacy on removing oleaginous films: (1) water as a control, (2) BARAKLEAN® casing cleaner (a surfactant solution, available from Halliburton Energy Services, Inc.) in water, (3) 8.4% solution of OPTIMA™ 300 resin emulsifier (a liquid emulsifier, available from Global Specialty Products USA, Inc.) in water, (4) 8.4% solution of S-1718 (a mutual solvent, available from Halliburton Energy Services, Inc.), and (5) 15% HCl in water.

A wettability meter was calibrated to 175 Hogan units (Hn) with a surfactant solution in water, then cleaned. Then, the wettability meter was filled with an oleaginous fluid of WELLLOCK® resin (a resin-based fluid, available from Halliburton Energy Services, Inc.), which was subsequently poured out leaving an oleaginous film on the surfaces of the wettability meter. The film weight was measured, and the wettability meter filled with one of the liquid test samples and stirred. The Hn values were measured as a function of time. After the Hn values reached a maximum, the % amount of resin removed from the surfaces was calculated by weighing the remaining resin. Table 1 provides the initial Hn values (after the liquid test sample was added), the final Hn values, the time to reach the final Hn value, and the % film remaining. Based on the % film remaining, it is clear that the tested fluids 2-5 would be suitable for use as liquids in the LIPS described herein.

TABLE 1

| Liquid Test Fluid | Initial Hn | Final Hn | Time to Final Hn (sec) | % Film Remaining |
|---|---|---|---|---|
| 1 | 60 | 160 | 319 | 48% |
| 2 | 50 | 167.5 | 1060 | 19% |
| 3 | 160 | 175 | 132 | 19.5% |
| 4 | 90 | 140 | 390 | 19% |

Example 2

MUSOL® A solvent (a mutual-solvent mixture, available from Halliburton Energy Services, Inc.) was added dropwise to SIPERNAT® 22 silica (a high-surface area, porous silica, available from Evonik Industries) until the porous silica was loaded with 2 mL of MUSOL® A solvent per gram of SIPERNAT® 22 silica. The specific gravity of the resultant LIPS was 1.2566 g/mL. The resultant LIPS was dry mixed with cement particles. To test the resin cleaning ability of a cement slurry produced from the LIPS/cement particle blend, the LIPS/cement particle slurry was added to the wettability apparatus to designate the 175 Hn setpoint. Then, the slurry was removed and the wettability apparatus cleaned. 150 mL of WELLLOCK® resin at about 80° F. was then placed in the wettability apparatus. While mixing at a constant RPM in the wettability meter and maintaining about 80° F., the slurry was added to the WELLLOCK® resin in 5 vol % increments. The Hn were measured after each addition (Table 2). The mixture reached 175 Hn at about a 50:50 mixture of the WELLLOCK® resin:slurry, which indicates that wettability was achieved. This demonstrates that about 5% MUSOL® A solvent bwoc is enough to achieve wettability (i.e., remove the WELLLOCK® resin from the surfaces), thereby demonstrating the efficacy of the LIPS described herein.

TABLE 2

| WELLLOCK® Resin (vol %) | Slurry (vol %) | Hn |
|---|---|---|
| 75 | 25 | 0 |
| 70 | 30 | 0 |
| 65 | 35 | 0 |
| 60 | 40 | 0 |
| 55 | 45 | 150 |
| 50 | 50 | 175 |
| 45 | 55 | 175 |
| 40 | 60 | 185 |
| 35 | 65 | 190 |
| 30 | 70 | 190 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    adding a flowable bulk solid into an aqueous fluid to produce a wellbore fluid, wherein the flowable bulk solid comprises a liquid-infiltrated porous silica, wherein the liquid comprises a liquid surfactant, an aqueous miscible fluid, or both, wherein the wellbore fluid further comprises a weighting agent that is different than the liquid-infiltrated porous silica, and wherein a weight ratio of the liquid-infiltrated porous silica to the weighting agent is about 0.1:99.9 to about 99.9:0.1; and
    introducing the wellbore fluid into a wellbore penetrating a subterranean formation.

2. The method of claim 1, wherein the liquid-infiltrated porous silica is present in the flowable bulk solid at about 0.1% to about 100% by weight of the flowable bulk solid.

3. The method of claim 1, wherein the wellbore fluid is a spacer fluid and the method further comprises:
    introducing an oleaginous drilling fluid into the wellbore;
    introducing the spacer fluid into the wellbore after the oleaginous drilling fluid; and
    introducing a cement slurry into the wellbore after the spacer fluid.

4. The method of claim 1, wherein the wellbore fluid is a cement slurry and further comprises cement particles, and wherein the method further comprises:
    introducing an oleaginous drilling fluid into the wellbore; and
    introducing the slurry into the wellbore after the oleaginous drilling fluid.

5. The method of claim 4, wherein the flowable bulk solid further includes a set retarder.

6. The method of claim 5, wherein a weight ratio of the set retarder to the liquid-infiltrated porous silica is about 1:700 to about 100:700.

7. The method of claim 4, wherein the flowable bulk solid further includes a set accelerator.

8. The method of claim 7, wherein a weight ratio of the set accelerator to the liquid-infiltrated porous silica is about 1:700 to about 100:700.

9. The method of claim 1, wherein the wellbore fluid further comprises a fluid loss control agent that is different than the liquid-infiltrated porous silica.

10. The method of claim 9, wherein a weight ratio of the fluid loss control agent to the liquid-infiltrated porous silica is about 1:700 to about 250:700.

11. The method of claim 1, wherein the wellbore fluid further comprises a polymer.

12. The method of claim 11, wherein a weight ratio of the polymer to the liquid-infiltrated porous silica is about 1:700 to about 250:700.

13. A system comprising:
a tubular extending into a wellbore penetrating a subterranean formation where an annulus is defined between the tubular and the wellbore; and
a pump fluidly coupled to the tubular, wherein the tubular, the annulus, or both contain a wellbore fluid produce by mixing water with a flowable bulk solid that includes a liquid-infiltrated porous silica, wherein the liquid comprises an aqueous miscible fluid, a liquid surfactant, or both, wherein the wellbore fluid further comprises a weighting agent that is different than the liquid-infiltrated porous silica and wherein a weight ratio of the liquid-infiltrated porous silica to the weighting agent is about 0.1:99.9 to about 99.9:0.1.

14. A method comprising:
introducing a composition into a wellbore penetrating a subterranean formation where an annulus is defined between the tubular and the wellbore,
wherein the composition comprises a flowable bulk solid that includes:
a liquid-infiltrated porous silica, wherein the liquid comprises an aqueous miscible fluid, a liquid surfactant, or both; and a weighting agent that is different than the liquid-infiltrated porous silica wherein a weight ratio of the liquid-infiltrated porous silica to the weighting agent is about 0.1:99.9 to about 99.9:0.1.

15. The method of claim 14, wherein the flowable bulk solid further includes cement particles.

16. The method of claim 15, wherein the flowable bulk solid further includes a set retarder.

17. The method of claim 15, wherein the flowable bulk solid further includes a set accelerator.

18. The method of claim 14, wherein the flowable bulk solid further includes a fluid loss control agent that is different than the liquid-infiltrated porous silica.

* * * * *